(12) United States Patent
Maloisel et al.

(10) Patent No.: US 10,465,153 B2
(45) Date of Patent: Nov. 5, 2019

(54) STABILIZATION OF FERMENTED BEVERAGES

(71) Applicant: GE Healthcare BioProcess R&D AB, Uppsala (SE)

(72) Inventors: Jean-Luc Maloisel, Uppsala (SE); Tobias Soderman, Uppsala (SE); Ola Lind, Uppsala (SE)

(73) Assignee: GE HEALTHCARE BIOPROCESS R&D AB, Uppsala (SE)

( * ) Notice: Subject to any disclaimer, the term of this patent is extended or adjusted under 35 U.S.C. 154(b) by 405 days.

(21) Appl. No.: 15/037,539

(22) PCT Filed: Nov. 26, 2014

(86) PCT No.: PCT/SE2014/051407
§ 371 (c)(1),
(2) Date: May 18, 2016

(87) PCT Pub. No.: WO2015/080657
PCT Pub. Date: Jun. 4, 2015

(65) Prior Publication Data
US 2016/0298065 A1 Oct. 13, 2016

(30) Foreign Application Priority Data
Nov. 28, 2013 (SE) ...................................... 1351414

(51) Int. Cl.
*C12H 1/056* (2006.01)
*B01D 15/00* (2006.01)
(Continued)

(52) U.S. Cl.
CPC ........... *C12H 1/0424* (2013.01); *B01D 15/00* (2013.01); *B01J 20/28004* (2013.01);
(Continued)

(58) Field of Classification Search
None
See application file for complete search history.

(56) References Cited

U.S. PATENT DOCUMENTS 2,947,633 A * 8/1960 Perry ......................... A23L 2/80
210/749
3,053,664 A * 9/1962 Hall ...................... C12H 1/0424
426/422
(Continued)

FOREIGN PATENT DOCUMENTS

| CA | 1178222 A | 11/1984 |
| CN | 1487993 A | 4/2004 |

(Continued)

OTHER PUBLICATIONS

Office Action Received for Chinese Patent Application No. 201480065006.5, dated Jan. 3, 2018, 16 pages (9 Pages of English Translation + 7 pages Official copy).
(Continued)

*Primary Examiner* — Ana M Fortuna
(74) *Attorney, Agent, or Firm* — WOOD IP LLC

(57) ABSTRACT

The invention discloses a separation matrix with a porous solid support and a plurality of polyvinylpyrrolidone (PVP) polymer chains covalently attached to the solid support. The polyvinylpyrrolidone polymer chains are either vinylpyrrolidone homopolymer chains or copolymer chains which comprise at least 70 mol % vinylpyrrolidone monomer residues and less than 2 mol % negatively charged monomer residues.

23 Claims, 10 Drawing Sheets a)

b)

(51) Int. Cl.
    *B01J 20/32* (2006.01)
    *B01J 20/28* (2006.01)
    *C08F 251/00* (2006.01)

(52) U.S. Cl.
    CPC .......... *B01J 20/321* (2013.01); *B01J 20/327* (2013.01); *B01J 20/3212* (2013.01); *B01J 20/3219* (2013.01); *B01J 20/3278* (2013.01); *B01J 20/3293* (2013.01); *C08F 251/00* (2013.01); *B01J 2220/58* (2013.01)

(56) References Cited

U.S. PATENT DOCUMENTS

| | | | |
|---|---|---|---|
| 3,554,759 A | | 1/1971 | Beschke et al. |
| 3,878,310 A | * | 4/1975 | Field ................... A23L 2/80 426/330 |
| 3,901,810 A | * | 8/1975 | Brooks ................ B01D 71/78 210/500.28 |
| 3,941,718 A | * | 3/1976 | Barabas ............... B05D 7/24 502/62 |
| 4,910,182 A | | 3/1990 | Hums et al. |
| 5,035,803 A | | 7/1991 | Cohen |
| 5,663,258 A | * | 9/1997 | Zhong ................. C08F 226/10 526/264 |
| 6,001,406 A | * | 12/1999 | Katzke ................ C12H 1/0432 210/660 |
| 6,156,851 A | | 12/2000 | Davankov et al. |
| 8,137,559 B2 | | 3/2012 | Katzke et al. |
| 9,481,859 B2 | | 11/2016 | Noordman et al. |
| 9,670,441 B2 | | 6/2017 | Zeiler et al. |
| 2003/0124233 A1 | * | 7/2003 | Gomez ................ B01D 39/04 426/422 |
| 2004/0224843 A1 | | 11/2004 | Hammen et al. |
| 2005/0145579 A1 | * | 7/2005 | Drohmann .......... B01D 39/06 210/777 |
| 2006/0249457 A1 | | 11/2006 | Van Alstine et al. |
| 2010/0028505 A1 | * | 2/2010 | Katzke ................. A23L 2/02 426/271 |
| 2010/0285094 A1 | * | 11/2010 | Gupta .................. A61L 15/60 424/429 |
| 2011/0097464 A1 | | 4/2011 | Holm et al. |
| 2011/0147308 A1 | * | 6/2011 | Johnston-Hall ...... B01D 61/145 210/650 |
| 2013/0129717 A1 | * | 5/2013 | Mac .................... C07K 16/2896 424/133.1 |
| 2013/0183403 A1 | * | 7/2013 | Noordman ........... B01D 41/02 426/16 |
| 2016/0298065 A1 | * | 10/2016 | Maloisel .............. B01D 15/00 |
| 2019/0111419 A1 | * | 4/2019 | Maloisel .............. B01J 41/20 |

FOREIGN PATENT DOCUMENTS

| | | |
|---|---|---|
| CN | 101733897 A | 6/2010 |
| CN | 103096992 A | 5/2013 |
| EP | 3074106 A1 | 10/2016 |
| JP | 48-044957 A | 6/1973 |
| JP | 49-072336 A | 6/1973 |
| JP | 2012-019785 A | 2/2012 |
| WO | 2002/057403 A1 | 7/2002 |
| WO | 2012/011808 A1 | 1/2012 |
| WO | 2013/162449 A1 | 10/2013 |
| WO | 2015/080657 A1 | 6/2015 |

OTHER PUBLICATIONS

International Search Report and Written Opinion regarding International Application No. PCT/SE2014/051407, dated Mar. 9, 2015, 12 pages.
International Preliminary Report on Patentability received for PCT Patent Application No. PCT/SE2014/051407, dated Jun. 9, 2016, 8 pages.
European Search Report received for European Patent Application No. 14866010.3, dated Jun. 26, 2017, 12 pages.
Office Action Received for Chinese Patent Application No. 201480065006.5, dated Apr. 12, 2017, 17 pages (11 Pages of English Translation + 6 pages Official copy).
Japan Notice of Preliminary Rejection for Japanese Patent Application No. 2016-534128, dated Jul. 31, 2018, 5 pages.

\* cited by examiner a)

b)

STABILIZATION OF FERMENTED BEVERAGES

CROSS-REFERENCE TO RELATED APPLICATIONS

This application is a filing under 35 U.S.C. 371 of international application number PCT/SE2014/051407, filed Nov. 26, 2014, which claims priority to Swedish application number 1351414-6, filed Nov. 28, 2013, the entire disclosures of each of which are hereby incorporated by reference.

TECHNICAL FIELD OF THE INVENTION

The present invention relates to stabilization of beverages, and more particularly to separation matrices for stabilization of fermented beverages. The invention also relates to a method for stabilization of beverages and to a method of manufacturing a separation matrix for stabilization of fermented beverages.

BACKGROUND OF THE INVENTION

In fermented beverages like beer and wine, undesirable haze may form during storage due to precipitation/aggregation of haze active (HA) compounds. These compounds may comprise HA polyphenols and HA polypeptides, as well as complex reaction products between them. To increase the colloidal stability of the beverages and enhance their shelf-life, the beverage can be treated to reduce the concentrations of HA compounds, which is often referred to as beer or wine stabilization.

There are several technologies to clarify beer and wine in order to improve the colloidal haze stability. The most common way to remove haze precursors is to add silica hydrogel (SHG) and/or cross-linked polyvinylpyrrolidone particles (polyvinylpolypyrrolidone or PVPP) into non-stabilized beer. Typically dosages are 15-40 g PVPP/hl and ~50 g SHG/hl (CW Bamforth: J Am Soc Brew Chem 57(3), 81-90, 1999). SHG is intended to reduce haze-active polypeptides and PVPP to reduce polyphenols. Both SHG and PVPP are used in the form of fine particles added to the beverage and afterwards removed by filtration. Traditionally the filter cakes have been discarded, but methods have also been suggested to regenerate the PVPP particles in a separate regeneration installation, as described in e.g. WO 2012/011808. This will however require complex operations and space for additional equipment.

U.S. Pat. No. 6,001,406 describes a method for beverage stabilization using an ion exchanger, in particular a water-insoluble porous hydrophilic matrix to which ion exchanging groups are covalently bound. Such a system has been commercialized by Handtmann Armaturenfabrik GmbH & Co. KG and GE Healthcare Bio-Sciences AB under the name of Combined Stabilization System (CSS), using positively charged crosslinked agarose heads in a packed bed column. The beads remain in the column during both stabilization and regeneration cycles and can be reused for years without any extra handling.

With increased demands on process efficiency and beverage stability, there is however a need for adsorbents with improved binding capacity for HA compounds. U.S. Pat. No. 8,137,559 describes an effort to achieve this with diethylene glycol based ligands on agarose beads, but there is still a need for adsorbents giving improved stabilization and which are able to stabilize higher beverage volumes before regeneration.

SUMMARY OF THE INVENTION

One aspect of the invention is to provide a separation matrix with an improved binding capacity for HA compounds in fermented beverages. This is achieved with a separation matrix as defined in claim 1.

One advantage is that the separation matrix is capable of improving the haze stability of fermented beverages in comparison with prior art matrices. Further advantages are that the separation matrix can be used and regenerated in packed beds, that it does not produce any leachables of food safety or food purity concern and that the matrix can be easily manufactured.

A second aspect of the invention is to provide a method of stabilizing fermented beverages, allowing an increased loading of beverage on the matrix. This is achieved with a method as defined in the claims.

A third aspect of the invention is to provide a process for manufacturing a separation matrix with improved capacity for HA compounds in fermented beverages. This is achieved with a method as defined in the claims.

Further suitable embodiments of the invention are described in the dependent claims.

DEFINITIONS

With "vinyl pyrrolidone" is herein meant 1-vinyl-2-pyrrolidinone, CAS 88-12-0, which is also commonly known as N-vinyl pyrrolidone.

FIGURES

Figure 8:
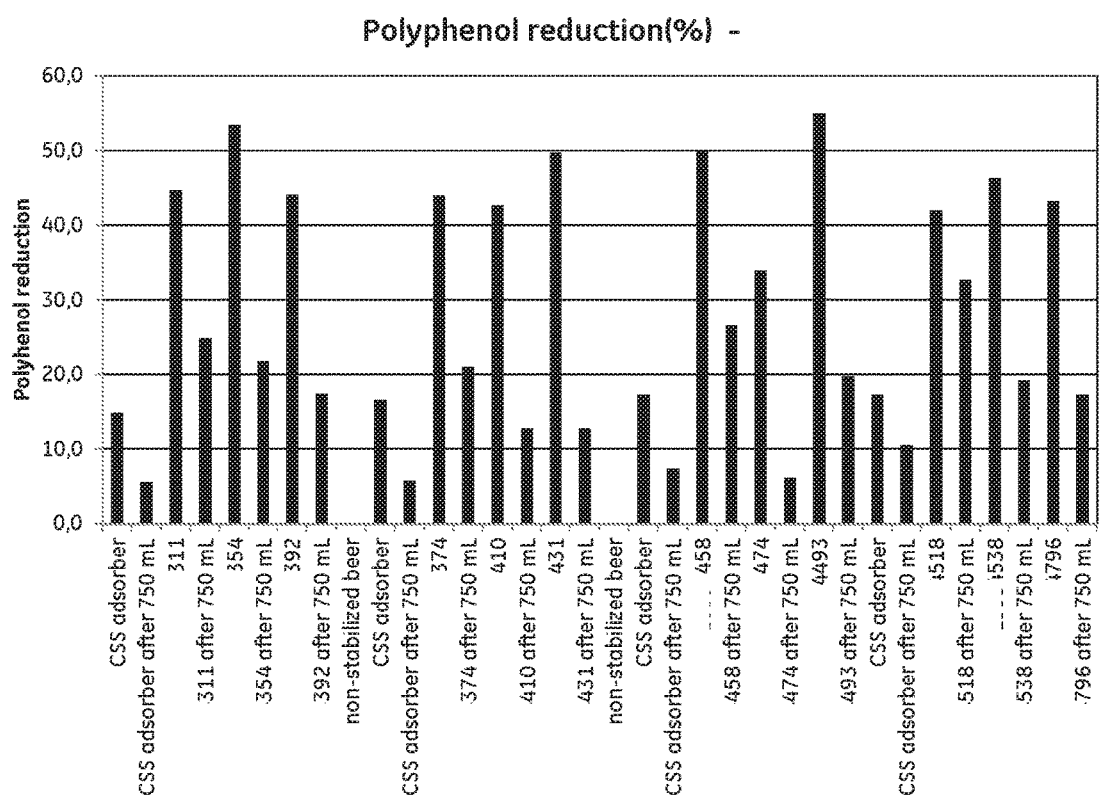

FIG. 8. Shows the total polyphenol reduction for prototypes.

Figure 9:
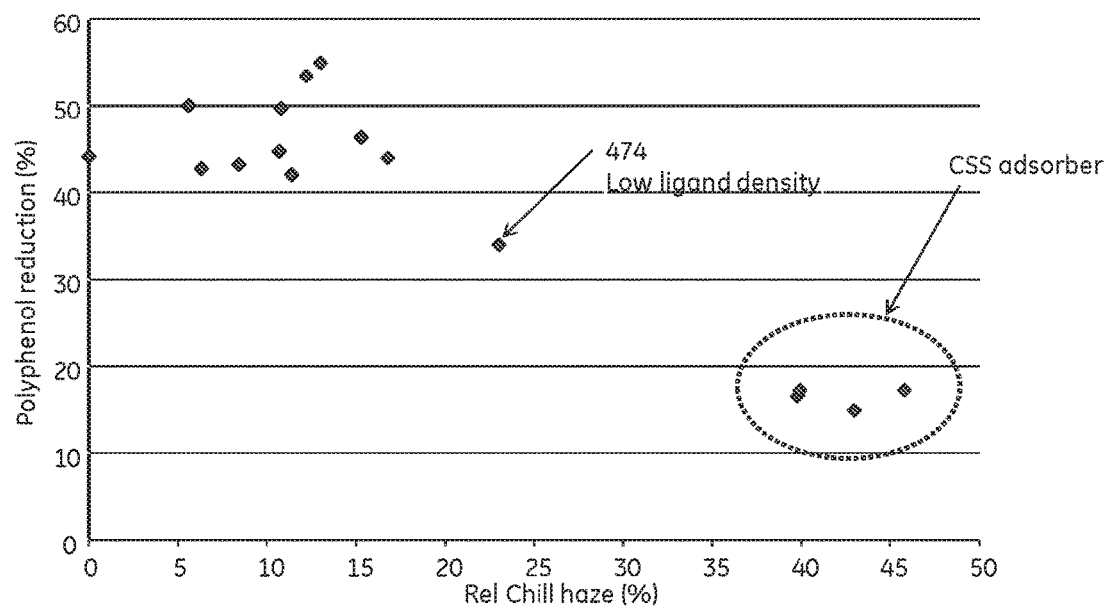

FIG. 9 Shows the correlation between total polyphenol reduction and chill haze.

Figure 10:
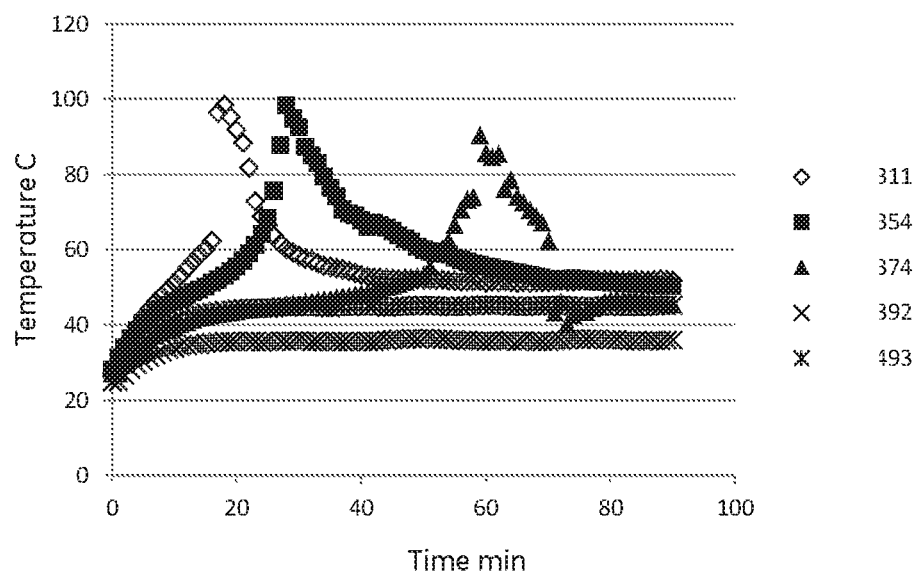

FIG. 10. Shows reaction temperature curves for selected experiments. 311—55° C. 1.9% initiator; 354—55° C. 1.0% initiator; 374—45° C. 1.0% initiator; 392—35° C. 1.0% initiator; 493—45° C. 1.0% initiator, 1 M Na2SO4

DETAILED DESCRIPTION OF EMBODIMENTS

In one aspect the present invention discloses a separation matrix comprising a porous solid support and a plurality of polyvinylpyrrolidone (PVP) polymer chains covalently attached to said solid support. The polyvinylpyrrolidone polymer chains are vinylpyrrolidone homopolymer chains or copolymer chains comprising at least 70 mol % vinylpyrrolidone monomer residues and less than 2 mol % or less than 1 mol % negatively charged monomer residues. Negative charges are likely to repel the, mostly negatively charged, HA compounds and thus reduce the performance of the matrix. It can also be advantageous if the polyvinylpyrrolidone polymer chains are free from negatively charged monomer residues. Suitably, the polyvinylpyrrolidone polymer chains are not crosslinked, in order to provide a high mobility and accessibility to HA compounds.

In some embodiments, the polyvinylpyrrolidone polymer chains comprise up to 30 mol % positively charged monomer residues. Positive charges may give advantageous additional interactions with negatively charged HA compounds. Positively charged monomer residues may be introduced by graft copolymerization of vinyl pyrrolidone with comonomers like e.g. diallyldimethylammonium chloride (DADMAC), 3-(methacryloylamino)propyltrimethylammonium chloride (MAPTAC), 2-(methacryloyloxy)ethyltrimethylammonium chloride, vinylpyridine, etc.

The polyvinylpyrrolidone polymer chains may alternatively or additionally comprise non-vinyl pyrrolidone non-charged monomer residues. Such residues may, particularly if they contain hydrophobic and/or hydrogen bonding moieties, modulate the interactions between the chains and the HA compounds in favourable ways. Specific monomers that can be used for these purposes include e.g. N-vinyl caprolactam, styrene, alkyl vinyl ethers (hydrophobic) and e.g. PEG-monomethacrylates, PEG monovinyl ethers, PEG monoallyl ethers, hydroxyalkyl vinyl ethers, allyl alcohol (hydrogen bonding). If only non-charged comonomers are used, their amount may be up to 30 mol %, and if a combination of non-charged and positively charged comonomers is used, their combined amount may be up to 30 mol %.

In some embodiments the solid support may comprise positively charged moieties which are not part of the polyvinylpyrrolidone polymer chains. Such moieties may e.g. be introduced by reacting hydroxyl groups on the support (e.g. a polysaccharide support such as agar or agarose) with positively charged reagents. Examples of such reagents include glycidyltrimethylammonium chloride and diethylaminoethylchloride.

In certain embodiments, the porous solid support comprises particles, such as particles having a (volume weighted) average diameter of 10-500 micrometers. Large particles give lower back pressures in packed beds and for this purpose it can be advantageous if the particles have an average diameter of 150-500 micrometers, such as 200-400 micrometers. The particles can suitably be spherical or substantially spherical, which facilitates packing.

In some embodiments, the porous solid support has a porosity of 80-98%, such as 90-98%. A high porosity is advantageous because the support can accommodate a large amount of polyvinylpyrrolidone polymer chains without blocking the pores. The porosity is defined as the volume fraction of pores in the support and can conveniently be measured by measuring the solids content of a support equilibrated with distilled water. With monolithic or membrane-shaped supports, the water-equilibrated support is freed from excess water, weighed and then dried in an oven at e.g. 100 C and weighed again. The volume fraction of pores can then be calculated, using an estimate of the density of the pore wall material. Particle-shaped supports are freed from excess water by gentle vacuum suction on a glass filter until a filter cake of particles is formed. The excess of water is removed when the water level has receded below the top of the filter cake until a first crack in the filter cake is formed. Prolonged suction should be avoided to avoid evaporation in the filter cake. A sample of the filter cake is then weighed and dried and the porosity is calculated from the wet ($m_{wet}$) and dry ($m_{dry}$) weights, using an estimate of the density of the pore wall material. Typical pore wall material densities ($\rho_{mat}$) are: agarose 1.5 g/cm$^3$, styrene-divinylbenzene 1.1 g/cm$^3$, methacrylate polymers 1.15 g/cm$^3$, polyvinyl alcohol 1.2 g/cm$^3$, silica 2.2 g/cm$^3$. The porosity (p) in vol % can then be calculated as:

$$p=100*((m_{wet}-m_{dry})/\rho_{H2O})/((m_{wet}-m_{dry})/\rho_{H2O}+m_{dry}/\rho_{mat})$$

where $\rho_{H2O}$ is the density of water at the temperature in question, typically 1.0 g/cm$^3$.

Alternatively, the pore structure of the support may be characterized by inverse size exclusion chromatography, in which case a Kay value is obtained. The Kay value is a measure of the volume fraction of the support which is accessible to a probe molecule of a certain size. Typically protein molecules with well-defined sizes are used as probe molecules, but it is also possible to use dextran fractions as probe molecules. Details of the measurements and the calculations of Kay values are given in Gel Filtration Principles and Methods, Pharmacia LKB Biotechnology 1991, particularly p. 10-11, which is hereby incorporated by reference. In some embodiments, Kay for human serum albumin (Mw 67 kDa) on the support is at least 0.4, such as at least 0.5 or 0.5-0.9.

In certain embodiments, the porous solid support comprises a polymer selected from the group consisting of styrenic polymers, methacrylate polymers, vinyl ether polymers, vinyl alcohol polymers and polysaccharides.

In some embodiments, the porous solid support comprises a polysaccharide selected from the group consisting of agarose, agar, cellulose and dextran. Polysaccharides are hydrophilic, which minimizes the risk of fouling due to hydrophobic interactions with compounds in the beverage. Agarose and agar can easily be prepared in the form of high porosity (e.g. 90-98% porosity) hydrogels with high rigidity, by thermal gelation. Of the two, agarose is more expensive but has the advantage that it is essentially free from negative charges. If agar is used, it can advantageously be treated with alkali to remove hydrolysable negatively charged groups. Polysaccharide supports can suitably contain less than 10 or less than 5 micromole/ml negatively charged and acidic groups. This content can be determined by titration methods well known in the art of cation exchangers.

The supports may additionally comprise extenders, i.e. polymers tethered to the pore surfaces of the support. The extenders can e.g. be hydroxyfunctional polymers, in particular polysaccharides like dextran, which can be tethered by covalent coupling on hydroxyl groups of the supports. A specific example is agar or agarose beads with dextran polymers tethered on agar/agarose hydroxyls which have been epoxy activated using epichlorohydrin or a diepoxide. The extenders can suitably be tethered via linker structures comprising ether groups which are stable under alkaline regeneration of the matrices. Extenders may facilitate the interactions between the HA compounds and the PVP chains and may increase the mass transport rates.

In certain embodiments a plurality of the polyvinylpyrrolidone polymer chains are each covalently linked to said solid support via a single linking moiety. The single linking moiety can e.g. comprise an ether-linked $C_3$ chain, such as in, —O—CH$_2$CHCH$_2$— or —O—CH$_2$—CH(OH)—CH$_2$—O—CH$_2$CHCH$_2$— as illustrated in FIG. 1a). Such linking moieties can be achieved by reacting hydroxyl groups on a support with an allyl halide or allyl glycidyl ether and polymerizing vinyl pyrrolidone in the presence of the support. Two polyvinylpyrrolidone polymer chain ends may be linked via the same linking moiety, if the polymerization proceeds through an allyl group. In this case, the matrix may additionally comprise a few polyvinylpyrrolidone polymer chains which are linked by two linking moieties, if the allyl density is high enough that one chain may polymerize through two adjacent allyl groups. The single linking moiety can also comprise a thioether bond, e.g. as illustrated in FIG. 1b). In this case, thiol groups have been introduced on the support and these have acted as chain transfer agents in the polymerization of vinylpyrrolidone. The linking via a single linking moiety, as opposed to multipoint attachment, improves the mobility of the polymer chains and thus their accessibility to and interaction with the HA compounds.

In some embodiments, the matrix comprises 0.50-4.0, such as 0.70-3.0 or 1.0-3.0 micromoles vinylpyrrolidone monomer residues per ml matrix. The content of vinylpyrrolidone monomer residues can be determined spectroscopically (e.g. NMR OR FTIR) or e.g. by nitrogen elemental analysis, where any nitrogens introduced via positively charged monomers can be titrated and subtracted from the total nitrogen. A high content of vinylpyrrolidone monomer residues is advantageous for both the binding capacity and the stability of the treated beverage.

In certain embodiments, the matrix comprises 0.50-0.80 g, such as 0.60-0.80 g, polyvinylpyrrolidone polymer per g dried matrix. Alternatively, the matrix may comprise 100-200 mg, such as 120-180 mg, polyvinylpyrrolidone polymer per ml drained matrix.

A high content of polyvinylpyrrolidone polymer is advantageous for both the binding capacity and the stability of the treated beverage. High polyvinylpyrrolidone polymer contents are particularly advantageous in combination with high porosities as discussed above. Overly high polyvinylpyrrolidone polymer contents may however have a negative influence on mass transport and/or the mechanical properties of the matrix.

In some embodiments, the matrix comprises less than 5 micrograms, such as less than 2 or less than 1 microgram carbon leachables per g dry matrix. Low leachable contents can be achieved by careful washing of the matrix before use and by using support materials which by themselves have low leachables content. The amount of carbon leachables can suitably be determined by the methods described in M Andersson et al: Process Biochemistry 33(1), 47-55, 1998, where 10 ml water-swollen matrix is incubated in 50 ml high purity water for 1 week and the total organic carbon (TOC) content of the water supernatant is determined. It is advantageous to minimize the leachables/extractables content due to food safety concerns but also with respect to purity regulations concerning e.g. beer in certain countries.

Figure 1:
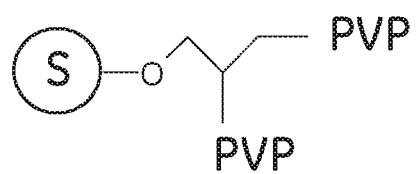
FIG. 1 shows examples of single linking moieties for the PVP chains: a) derived from allylic groups and b) derived from thiol groups. S is the support.
Figure 1:
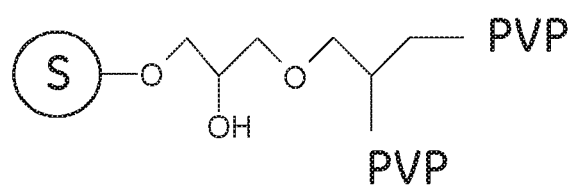
Figure 1:
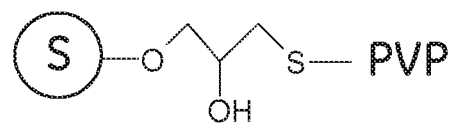
Figure 2:
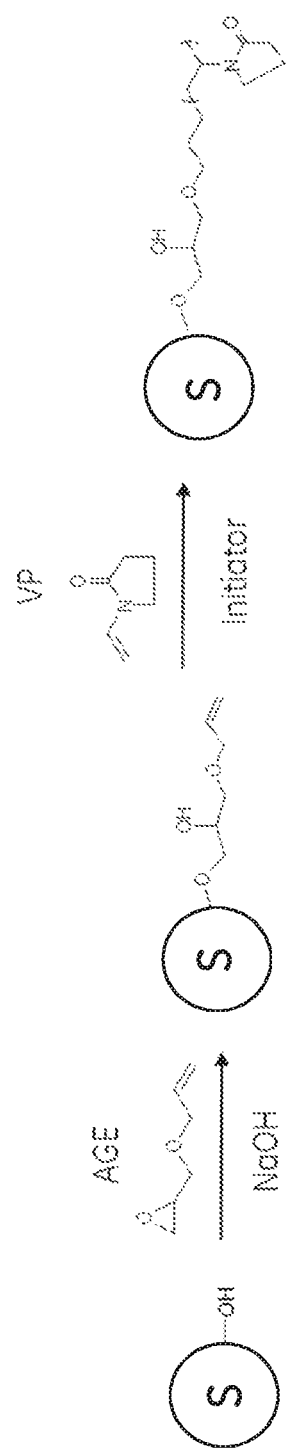
FIG. 2 shows a grafting process of the invention, with a hydroxyfunctional support first reacted with allyl glycidyl ether (AGE) and vinyl pyrrolidone (VP) then grafted on the allyl-functional support.
Figure 3:
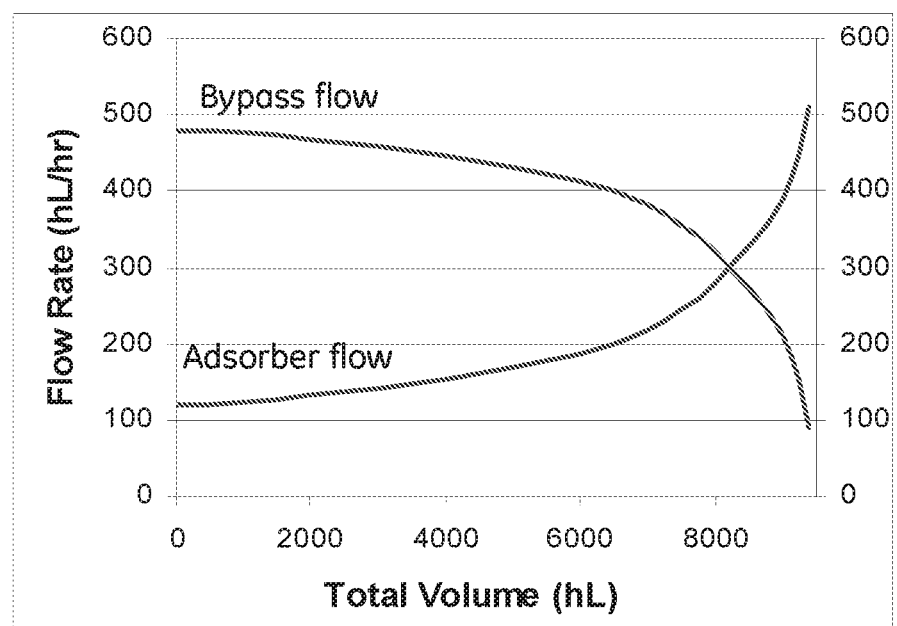
FIG. 3 shows a typical stabilisation curve for the CSS adsorber anion exchange matrix.

The poly(vinyl pyrrolidone) (hereafter denoted PVP) can be attached in a grafting reaction sequence as shown in FIG. 1.

1. Allylation. In this step allyl groups are introduced. Allyl glycidyl ether or an allyl halide is attached under alkaline conditions to a hydroxyl-functional base matrix (e.g. a cross-linked agarose base matrix such as Sepharose™ Big Beads).

2. Grafting of PVP. Vinyl pyrrolidone (VP) and a radical initiator (e.g. ADBA) are dissolved in an aqueous solution containing the allylated particles. Pure water or aqueous salt solutions (e.g. sodium sulfate) are examples of possible reaction solvents. The mixture is heated, whereby the initiator decomposes and forms free radicals that start a polymerization of vinyl pyrrolidone. The growing PVP chains can also react with the allyl groups on the particles and this way PVP chains are attached covalently to the particles.

The fine structure of the PVP chains it not known in detail, e.g. the molecular weight, molecular weight distribution and how much of the allyl groups that are consumed.

A main parameter that can be measured is the dry weight (solids content) of 1 mL gel before and after the grafting reaction. This way the amount of attached PVP in mg/mL can be calculated.

Other parameters such as average amount of PVP/allyl group (which gives an indication of average chain length) or % PVP in the structure can also be calculated.

The following parameters are believed to affect the amount of PVP that is attached.
The concentration of VP in the reaction mixture.
Initiator concentration
Polymerization temperature
Amount of allyl groups attached to the particles
Type of initiator
Reaction solvent
Slurry concentration of the particles (the amount of allylated particles)
Base matrix parameters (particle size, pore size distribution, dry weight)

The polymerization of VP is an exothermic reaction. The potential temperature rise will be affected by the reaction speed, the total amount of heat and by how much reaction solvent that is present to take up the heat (i.e. the heat capacity of the solvent).

The total amount of heat generated will be governed mainly by the amount of VP used while the speed of the reaction will determine the amount of generated heat per time unit. The initiator concentration and the reaction temperature are the main parameters that will affect the speed of the reaction. A temp log can be used to track the temperature in the reaction vessel over time.

In one aspect the present invention discloses a method for stabilizing a fermented beverage, e.g. beer, comprising the steps of:

a) providing a column packed with a separation matrix comprising a porous solid support and a plurality of polyvinylpyrrolidone polymer chains covalently attached to said solid support, wherein said polyvinylpyrrolidone polymer chains are vinylpyrrolidone homopolymer chains or copolymer chains comprising at least 70 mol % vinylpyrrolidone monomer residues. The separation matrix can e.g. be a separation matrix as disclosed above;

b) passing the beverage through said column and recovering a flow-through of the column as a stabilized beverage. In step b), the residence time of the beverage in the column can e.g. be 2 min or less, such as 1 min or less or 10 s-1 min. The residence time is calculated as the bed height (cm) of the column divided by the flow velocity (cm/min) of the beverage through the bed of the column A short residence time is desirable for economical reasons and the matrices of the invention have a sufficiently high mass transport rate to allow sufficient haze stabilization at residence times below 1 or 2 min. The stabilized beverage (beer) in step b) can have a chill haze of less than 25% of the chill haze for the beverage before passage of said column. The chill haze can suitably be measured according to the well known EBC method (method no. 31.1) and the residence time on the column can be less than 1 minute, such as 18 s.

In certain embodiments the method further comprises the steps of:

c) regenerating the column with a regeneration solution and;
d) repeating steps a)-c) at least twice, such as at least 10, at least 50 or at least 500 times. This has the advantage that the separation matrix is reused in a large number of cycles, which is beneficial for the overall process economy.

In some embodiments the regeneration solution comprises NaOH, such as at least 0.1 M NaOH or 0.1-2 M NaOH, e.g. about 1 M NaOH. NaOH solutions can efficiently remove adsorbed contaminants and NaOH is also an accepted cleaning agent in the beverage industry, which if the pH is controlled after cleaning does not leave any toxic or bad tasting residues.

In a third aspect the present invention discloses a method of manufacturing the separation matrix as disclosed above. This method comprises the steps of:

a) providing a porous solid support comprising at least 5 micromole/ml radical-reactive moieties. The radical-reactive moieties can be polymerizable moieties, such as C=C double bonds, chain transfer moieties, such as thiols or they can be immobilized initiators;
b) contacting the support with a monomer composition wherein at least 70 mol % of the monomers in said monomer composition is N-vinyl pyrrolidone and less than 1 mol % or less than 2 mol % of the monomers are negatively charged;
c) initiating a free radical polymerization to form a matrix having polyvinylpyrrolidone polymer chains covalently attached to the support, and;
d) washing the matrix.

In certain embodiments step a) comprises either i) providing a divinylbenzene copolymer support, which comprises at least 5 micromole/ml residual double bonds, or ii) reacting a hydoxyfunctional support with an allyl halide or allylglycidyl ether.

In some embodiments step c) is performed with the support suspended in an aqueous solution comprising the monomer composition and 0.05-3 mol/l of a salt, such as 0.1-2 M sodium sulfate or ammonium sulfate. An advantage of using an aqueous salt solution is that it has a high heat capacity and that the amount of monomer needed to get a certain amount of grafted PVP can be reduced. These factors mean that the temperature rise due to exothermal heat generation can be reduced, which is important for the scaleability of the process.

Alcohol Chill Haze

Assay description from Pfeuffer GMBH. European brewers convention (EBC) analytical method no 31.1.

"When greatly undercooled beer demonstrates a reversible turbidity which is dependent on the condition of beer and is caused by precipitated polyphenol protein complexes. The addition of ethanol reduces the solubility of the complexes and thus accelerate the formation of turbidities. The low-temperature test, which can be performed quickly, makes it possible to predict the expected long-term turbidity of beer. Even immediately after beer stabilization treatment, this test provides precise information on the turbidity potential of the beer and the effectiveness of stabilization measures, which can then be evaluated and changed if necessary."

Tannoids

Assay description from Pfeuffer GMBH.

"The tannoids are the amount of polyphenols which are PVP-precipitable. Among them are low to middle molecular weight polyphenols as well as polymers of catechin and anthocyanogens. Tannoids come from malt and hops. Although they are present in small quantities in beer, they are of great significance with regard to the colloid stability and the flavour consistency. The tannoid content of beer, worts, barley, malt and hops extracts can be determined by means of precipitation using PVP. PVP, a protein-like compound, attaches to tannoids via H-bridges and forms insoluble complexes with them, thus leading to turbidity. If a PVP solution is continuously added to the specimen the turbidity will increase until all tannoid molecules are attached to the PVP. Further batching of PVP will lead to an increase in turbidity due to dilution. The amount of PVP added until the turbidity peak has been reached is proportional to the tannoid content".

Total Polyphenols

Assay description from EBC method 9.11. The total polyphenol assay covers all polyphenols. Beers with high amount of total polyphenols>200 mg/L are considered to be difficult to stabilize while beers with total polyphenol<150 mg/L are more easy to stabilize using PVPP treatment. The total polyphenol determination is made by reacting beer polyphenols with ammonium iron citrate at basic conditions. The ferric-polyphenol complex is measured at absorbance at 600 nm against a blank solution.

EXAMPLES

Example 1. Grafting Study

The main purpose of the study was to find reaction conditions where a suitable amount of PVP could be attached, where the temperature is under control and boiling can be avoided. The following synthesis parameters were included in the study.

Polymerization temperature (varied between 35 and 55° C.)

Initiator concentration (varied between 1.0 and 1.9% w/w)

Amount of allyl groups (varied between 82 and 170 μmol/mL)

VP concentration (varied between 10.0 and 39.2% w/w)

Slurry concentration (varied between 18.5 and 36.9% v/w)

The identity of the initiator (ADBA) was kept constant throughout since it is readily soluble in water and decomposes in a suitable temperature range.

TABLE 1

Prototype overview.

| Proto-type | Allylated Gel | Allyl content [μmol/mL] | Comment | VP + initiator [% w/w] | Initiator conc. [% w/w VP] | Temperature [° C.] | Amount of gel [mL] | Reaction Slurry conc. [% v/w] |
|---|---|---|---|---|---|---|---|---|
| 9018 | 9013 | 150 | Initial prototype | 39.2 | 1.9 | 55 | 100 | 36.9 |
| 311 | 184K | 170 | Reference experiment | 39.2 | 1.9 | 55 | 100 | 36.9 |
| 354 | 184K | 170 | Lower initiator conc. | 39.2 | 1.0 | 55 | 100 | 36.9 |
| 374 | 184K | 170 | Lower temperature | 39.2 | 1.0 | 45 | 100 | 36.9 |
| 392 | 184K | 170 | Lower temperature | 39.2 | 1.0 | 35 | 100 | 36.9 |
| 410 | 184K | 170 | Lower VP concentration | 19.6 | 1.0 | 45 | 100 | 36.9 |
| 431 | 184Q | 82 | Lower allyl content | 19.6 | 1.0 | 45 | 100 | 36.9 |
| 458 | 184R | 166 | 0.5M Na$_2$SO$_4$ | 19.6 | 1.0 | 45 | 100 | 36.9 |
| 474 | 184R | 166 | 1M Na$_2$SO$_4$ | 19.6 | 1.0 | 45 | 100 | 36.9 |
| 493 | 184R | 166 | 10% VP, 1M Na$_2$SO$_4$ | 10 | 1.0 | 45 | 100 | 36.9 |
| 518 | 184R | 166 | 50 mL gel 1M Na$_2$SO$_4$ | 10 | 1.0 | 45 | 50 | 18.5 |
| 538 | 184R | 166 | Repro of prot. 493 | 10 | 1.0 | 45 | 100 | 36.9 |
| 796 | 184Q | 82 | 1M Na$_2$SO$_4$, lower allyl | 10 | 1.0 | 45 | 100 | 36.9 |

Amount of Gel [mL]:

The amount of gel to be rafted.

Reaction Slurry Concentration [v/w]:

This parameter decides how concentrated the reaction slurry should be. A higher value means that there is less reaction solution per mL gel.

%VP+Initiator [% w/w]:

This parameter determines how much of the reaction suspension in weight-% that should consist of VP and initiator, the active substances.

Initiator Concentration [% w/w]:

This parameter determines how many % initiator that should be used in relation to the amount of VP.

See typical recipes below.

Allylation Method (Typical Recipe)

Beads of 6% agarose crosslinked with epichlorohydrin and having an average (volume-weighted) diameter of 200 micrometers (a sieve fraction between 100 and 300 micrometers) were used as the base matrix.

100 mL base matrix gel was transferred to a glass filter (pore size rate 2) and sucked dry. Thereafter the gel was washed with 2000 mL of water in portions. The gel was sucked dry after the last wash and was transferred to a 500 mL round bottom flask and water was added to a total weight of 87.14 g. 92.16 g of 50 (w/w) sodium hydroxide solution was added.

The round bottom flask was mounted and immersed in a bath that held 50° C. A two-bladed swing-out stirrer with a 5 cm diameter was used and the stirring was set at 350 rpm. When the temperature had reached 50° C., 33.0 g allylglycidyl ether was added. The reaction was let to stand for 18 hours. The reaction was then neutralized with 114.98 g of 60% acetic acid in portions.

The gel was washed with 20×GV water followed by 5×GV of ethanol, 20×GV of water again and finally 3×GV 20% ethanol solution.

The allyl content was determined by titration and was found to be 231 micromol/mL Grafting Method (Typical Recipe), See Table 1 for Specific Details on Other Syntheses.

1.0 M sodium sulfate was prepared by dissolving 284.1 g of anhydrous sodium sulfate into a final volume of 2000 mL in a measuring flask.

100 mL gel=234.0 g slurry was transferred to a filter (por. 2) and sucked dry. The gel was washed with 5000 mL of water in portions. Then the gel was washed with 3×150 mL of 1.0 M sodium sulfate and sucked dry in between washes.

The round-bottom flask was placed on a balance and it was tared. The "dry" gel was transferred to the round-bottom flask and the total weight was adjusted to 244.7 g with the 1.0 M sodium sulfate solution.

26.3 g of vinyl pyrrolidone and 0.25 g of ADBA was added.

The round bottom flask was mounted. An overhead stirrer motor with a 5 cm swing-out two-blade agitator was used. Nitrogen gas was bubbled through the reaction solution (with a Pasteur pipette) for about 25 minutes. The stirring rate was 200 rpm.

A glycerol bath was set to 45 degrees. When this temperature was reached the round-bottom flask was immersed in the glycerol bath and the reaction was started.

After a few hours, a suspension of polymer in water was formed; the polymer particles were about 2 mm in diameter. The reaction was allowed to proceed overnight. ~200 g of distilled water was added to dilute the reaction solution. The polymer lumps disappeared and the reaction solution was easily filtered off.

The gel was washed with 20 L of distilled water, and 1 L of 20% ethanol.

The dry weight was recorded after the grafting reaction, and was found to be 265 mg/mL.

Dry Weight Measurement

A dry weight balance set at 120° C. was used for all dry weight measurements. For dry weight measurement 1 mL of gel is transferred from a glass filter with a PTFE top designed to accommodate 1.0 ml filter cake to the aluminium cup of the balance.

A recipe is sought that gives 100-200 mg/mL of attached PVP, where there is no significant temperature rise during the reaction and that is in all aspects suitable for production scale.

TABLE 2

Overview of further prototypes.

| | | Grafting Parameters | | | | | | | |
|---|---|---|---|---|---|---|---|---|---|
| Proto-type | Allyl content [μmol/mL] | Solvent | Amount of VP [% w/w] | Initiator [% w/w] | Temp. [° C.] | Boil? | Viscous Solution? | Dry content after grafting [mg/mL] | PVP attached [mg] | % PVP [w/w] |
| 9018 | 150 | Water | 39.2 | 1.9 | 55 | Yes | Yes | 268 | 199 | 74.3 |
| 311 | 170 | Water | 39.2 | 1.9 | 55 | After 17 min. | Yes | 288 | 216 | 75.0 |
| 354 | 170 | Water | 39.2 | 1.0 | 55 | After 29 min. | Yes | 299 | 227 | 75.9 |
| 374 | 170 | Water | 39.2 | 1.0 | 45 | After 59 min. | Yes | 310 | 238 | 76.8 |
| 392 | 170 | Water | 39.2 | 1.0 | 35 | No | Yes | 206 | 134 | 65.0 |
| 410 | 170 | Water | 19.6 | 1.0 | 45 | No | Yes | 192 | 120 | 62.5 |
| 431 | 82 | Water | 19.6 | 1.0 | 45 | No | Yes | 174 | 113 | 64.9 |
| 458 | 166 | 0.5M Na$_2$SO$_4$ | 19.6 | 1.0 | 45 | No | Yes | 227 | 154 | 67.8 |
| 474 | 166 | 1M NaSO4 | 19.6 | 1.0 | 45 | No | Yes | 152 | 79 | 52.0 |
| 493 | 166 | 1M Na$_2$SO$_4$ | 10 | 1.0 | 45 | No | No | 265 | 192 | 72.5 |
| 518 | 166 | 1M Na$_2$SO$_4$ | 10 | 1.0 | 45 | No | No | 189 | 116 | 61.4 |
| 538 | 166 | 1M Na$_2$SO$_4$ | 10 | 1.0 | 45 | No | No | 267 | 194 | 72.7 |
| 796 | 82 | 1M Na$_2$SO$_4$ | 10 | 1.0 | 45 | No | No | 226 | 165 | 73.0 |

The first prototype, 311 had an allyl content of 170 μmol/mL. The amount of PVP that was attached was 216 mg/mL. The synthesis setup for this set of experiments was thus deemed to be OK, although the exotherm caused boiling. A very viscous solution is formed that is spun up around the stirrer. The viscosity increased simultaneously with the occurrence of the boiling. The reaction never boiled over however and was therefore allowed to proceed overnight.

The next experiment was 354, where the amount of initiator was decreased from 1.9% to 1.0%. The theory was that a lower initiator concentration should lower the speed of the reaction and this could potentially reduce the risk of boiling. This did not turn out to be the case; boiling still occurred. However the boiling was indeed postponed from 17 minutes to 29 minutes. The amount of PVP that was attached was in fact higher than for 311, 227 mg/mL compared to 216 mg/mL. For all subsequent experiments the initiator concentration was therefore set to 1.0% since this had a positive effect on both boiling and the amount of PVP that was attached. This parameter could however be optimized further in future studies, an even lower initiator concentration would for example be interesting to investigate.

For the following two experiments, 374 and 392, all parameters were held constant except temperature. The previous experiments were run at 55° C. while 45 and 35 degrees were used for 374 and 392 respectively. By going to 45° C. the boiling was further postponed to after 59 minutes of reaction. When 35° C. was used no boiling occurred. The temperature profiles for these reactions can be found in Appendix A along with selected temperature curves from later experiments. At 45° C. there was even more PVP attached than at 55° C. 238 mg/mL compared to 227 mg/mL. It could be that the more controlled reaction at 45° C. favours attachment of PVP. At 35° C. however there is a clear drop in the amount of PVP that is attached, only 134 mg/mL was attached in this case. The reaction temperature has thus a pronounced effect on both the boiling tendency and the amount of PVP that is attached. 45° C. was used for all subsequent experiments since at this temperature high amounts of PVP could clearly be attached, while the boiling tendency was lower than at 55° C.

In order to avoid boiling totally the amount of VP in the reaction was halved to 19.6% for the next two experiments. The effect of allyl content was also investigated. For 410 the allyl level was 170 μmol as for all previous experiments while for 431 the allyl content was 82 μmol/mL. By reducing the VP concentration the boiling was avoided but the reaction solution still became very viscous and was spun around the stirrer. This problem also had to be solved in order to get a production-friendly recipe.

The amount of PVP attached was also clearly lower for 410 compared to 374, 120 mg/mL compared to 238 mg/mL. It is interesting to see that a reduction in half of the VP concentration results in half the amount of VP attached. The effect of the allyl content was not very pronounced. For 431 where an allyl level of 82 μmol/mL was used, 113 mg/mL of PVP was attached compared to 120 mg/mL for 410 where the allyl level was more than two times higher, 170 μmol/mL.

In order to see if more PVP could be attached with 19.6% VP in the reaction solution, 0.5 M (458) and 1.0 M Na$_2$SO$_4$ (474) was tried as reaction solvent. When 0.5 M Na$_2$SO$_4$ was used there was an increase of the amount of PVP that was attached, 154 mg/mL for 458 compared to 120 mg/mL for 410. When the sodium sulfate concentration was increased to 1.0 M much less PVP was attached, only 79 mg/mL for 474. However for both syntheses there was a very pronounced precipitation of PVP in the reaction solution which probably hindered an effective coupling.

For the next experiment 493, in order to avoid precipitation a lower amount of PVP was tried, only 10% while keeping 1 M Na$_2$SO$_4$ as reaction solvent. This proved to be a successful way forward. 192 mg/mL of PVP was attached in this experiment. A slight phase separation with small polymer particles can be seen but when water is added after the reaction is complete the polymer droplets are readily dissolved and the reaction solution becomes clear. The particles can easily be washed on a filter. The polymer droplets should be kept under observation during scale-up to make sure that they stay easily dissolved.

A higher ratio of VP vs. particles (i.e. a lower reaction slurry concentration) was also tried in 518 with in all other aspects the same grafting recipe as in 493. For 518 the amount of particles was 50 mL compared to 100 mL that was used for all other syntheses. This was thought to increase the amount of PVP further but this was not the case, there was less PVP attached with this recipe, 116 mg/mL for 518 compared to 194 mg/mL for 493.

538 is a reproduction of 493 to ensure that the recipe is robust. An almost identical result was obtained 194 mg/mL in attached PVP for 538 compared to 192 mg/mL for 493.

A final experiment, 796, was made in order to see the effect of the allyl content on the optimized grafting recipe. For 796 an allyl level of 82 µmol/mL was used compared to 166 µmol/mL that was used for 493. This resulted in a lower amount of PVP attached 165 mg/mL compared to 192 mg/mL for 493. The effect of the allyl level is not drastic however.

Boiling can be avoided for the experiments where 19.6% VP or less is used.

Temperature has a large effect on the amount of PVP that is attached and on the boiling tendency. Temperatures above 35° C. improve the coupling reaction efficiency.

The amount of VP+initiator is an important synthesis parameter; it significantly affects the amount of PVP that is attached, the boiling tendency and the viscosity of the reaction solution.

The allyl content affects the amount of PVP that is attached; higher allyl contents give higher amounts of PVP attached. The effect is not dramatic however. When the amount of allyl groups is reduced from 166 to 82 µmol/mL the amount of PVP attached is only reduced from 192 to 165 mg/mL.

Using sodium sulfate in the reaction solution has a large positive effect on the amount of PVP that is attached, provided that precipitation of PVP is avoided.

Boiling, a viscous reaction solution or PVP precipitation was avoided for prototype 493 where 10% VP in combination with 1.0 M $Na_2SO_4$ was used. These conditions resulted in 192 mg/mL of attached PVP which is similar to the amount of PVP that was attached for the reference prototype 9018, 199 mg/mL. This prototype has good performance, and the reaction conditions used for this prototype can be used as a starting point for further optimization.

Prototypes, shown in Table 3, except 9018, were evaluated by flowing 750 ml non-stabilized lager beer through a column packed with 1 mL of the resin prototype at a flow-rate of 3.3 mL/min (18 sec residence time) and at a temperature of <5° C. The flow-through beer was analysed with "Alcohol chill haze", "Tannoids" and "total polyphenols" and compared to non-stabilized beer and non-stabilized beer that has been processed through CSS adsorber (Q Sepharose BB). For the three first prototypes tested the Tannoid content was zero and the Tannoid content assay was leaved for the rest of the prototypes since more beer needs to be processed through the 1 mL column to evaluate the tannoid breakthrough. It should be noted that a high level of tannoids was determined in beer after CSS adsorber processing, given the hint that the prototypes are working extremely well since the assay "tannoids" is considered as the assay that correlates the best to colloidal stability.

TABLE 3

Prototypes evaluated with the beer stabilization process

| Prototype | Allyl content [µmol/mL] | Dry content allylated gel [mg/mL] | Dry content grafted [mg/mL] | PVP attached (mg) | % PVP | Comment | % VP solution | % initiator | Temp C. | Boiling |
|---|---|---|---|---|---|---|---|---|---|---|
| 311 | 170 | 72 | 288 | 216 | 75.0 | Reference experiment | 39.2 | 1.9 | 55 | Yes after 17 minutes |
| 354 | 170 | 72 | 299 | 227 | 75.9 | lower initiator conc. | 39.2 | 1.0 | 55 | Yes after 29 minutes |
| 374 | 170 | 72 | 310 | 238 | 76.8 | lower temperature | 39.2 | 1.0 | 45 | Yes after 59 minutes |
| 392 | 170 | 72 | 206 | 134 | 65.0 | lower temperature | 39.2 | 1.0 | 35 | No |
| 410 | 170 | 72 | 192 | 120 | 62.5 | Lower VP concentration | 19.6 | 1.0 | 45 | No |
| 431 | 82 | 61 | 174 | 113 | 64.9 | Lower allyl content | 19.6 | 1.0 | 45 | No |
| 458 | 166 | 73 | 227 | 154 | 67.8 | 0.5M Sodium Sulfate | 19.6 | 1.0 | 45 | No |
| 474 | 166 | 73 | 152 | 79 | 52.0 | 1M Sodium Sulfate | 19.6 | 1.0 | 45 | No |
| 493 | 166 | 73 | 265 | 192 | 72.5 | 1M Sodium Sulfate | 9.8 | 1.0 | 45 | No |
| 518 | 166 | 73 | 189 | 116 | 61.4 | 1M Sodium Sulfate, 50 mL gel | 9.8 | 1.0 | 45 | No |
| 538 | 166 | 73 | 267 | 194 | 72.7 | 1M Sodium Sulfate repro LS004493 | 9.8 | 1.0 | 45 | No |
| 796 | 82 | 61 | 226 | 165 | 73.0 | 1M Sodium Sulfate low allyl | 9.8 | 1.0 | 45 | No |

Methods Beer Stabilization

Column Packing:

Each prototype and reference (CSS adsorber lot 10039019) was packed in a Tricorn 5/100 column (GE Healthcare) at 2 mL/min. The bed height was adjusted to 5.1±0.1 cm at 2 mL/min to obtain a bed-volume of 1.0 mL resin. The top adaptor was adjusted 1 mm below the 5.1 cm mark and the column was equilibrated at 2 mL/min with 5 column volumes of water prior to the beer application.

Figure 4:
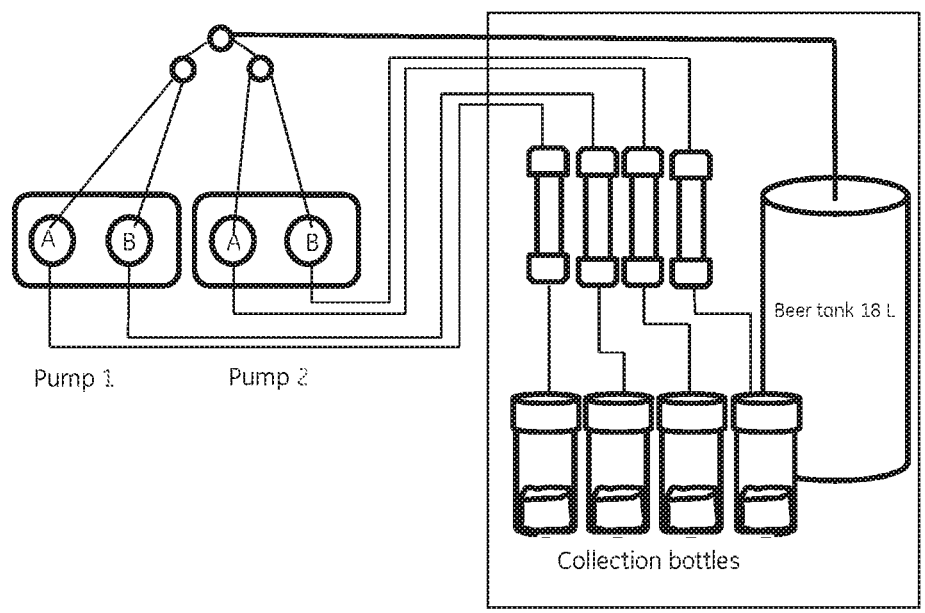
FIG. 4 shows the set-up of the miniaturised beer stabilization test application.

Beer Application:

FIG. 4 shows the set-up of the miniaturised beer stabilization application. A 18 L Cornelius bottle of non-stabilised beer was obtained from Slottkällans brewery (Uppsala, Sweden) and put into a 0° C. incubator for three days. Fresh beer that has been sterile filtered must be restored for a couple of days to obtain stable results. The tube from the beer bottle was split into 2 pumps and 4 pump heads (P-900 pumps, GE Healthcare) to be able to run 4 prototypes simultaneously. Since it is impossible to remove bubbles from the beer tubes the actual flow-rate must be calibrated. All pump-heads was set to 4.0 mL/min and 10 mL volumetric flasks were filled and the time to fill up the volumetric flasks to the mark was noted and the actual flow-rate with beer was calculated to 3.3 mL/min for all pump-heads. The 4 columns with prototypes were put into the incubator and tubes from the pump-heads were connected to the columns. 1000 mL collection bottles were connected after each column in the incubator. The first column in the test series was always the reference column containing CSS adsorber lot 10039019. These beads have diameters in the range of 100-300 micrometers, with volume-weighted average diameter 200 micrometers and a quaternary ammonium group content of 0.18-0.25 mmol/ml. 750 mL beer was pumped through each column at a flow-rate of 3.3 mL/min which corresponds to a residence time of 18 s, i.e. ~3 times faster than the ordinary CSS process. The process time was 3.75 h. Beer that had been flowed through the column was collected in the 1000 mL bottles for analysis.

Methods Alcohol Chill Haze Analysis

Beer samples from the 1000 mL collection bottles were analyzed within 20 hour after beer stabilization process. First non-stabilized beer from the Cornelius bottle was analyzed followed by the CSS adsorber reference sample and the prototypes. ~20 mL beer was transferred into a 50 mL Falcon tube and the tube was shaken briefly to remove carbon dioxide. After the beer has been settled, 4×1.0 mL of the beer was pipetted carefully into the cuvette. 120 µL ethanol was pipetted into the clean cuvette and the cuvette was turned carefully up and down 5 times prior analysis. 0.6 mL ethylene glycol was added to the cuvette chamber in the Tannometer to increase the thermal contact between the cuvette and the cooler. The cuvette was placed in the cuvette chamber and the Alcohol chill haze analysis was started. The sample in the cuvette was frozen down to −5° C. and the turbidity was measured after the sample has been incubated for 40 minutes. It was shown that after ~10 minutes, the turbidity remained same turbidity as for 40 minutes, so for some samples the turbidity was monitored after 20 minutes to speed up the analysis.

Figure 5:
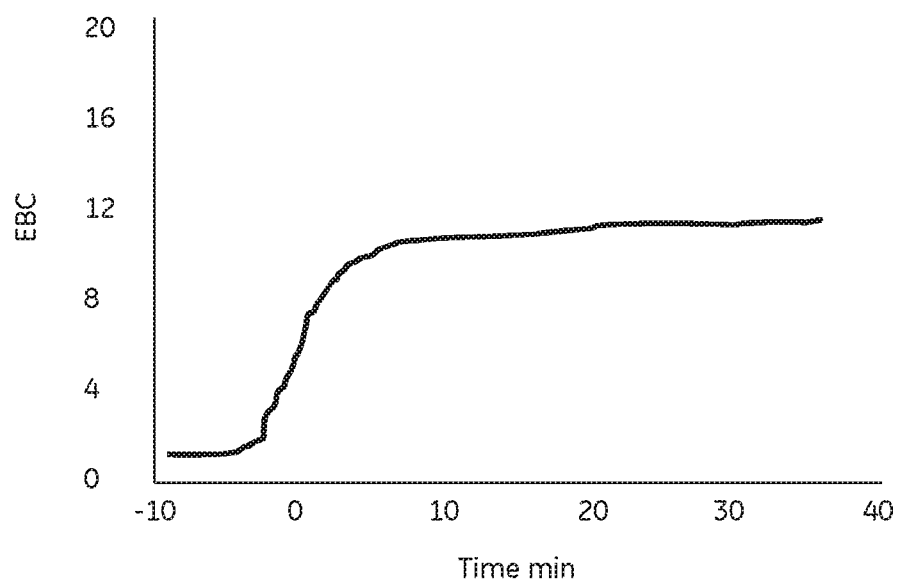
FIG. 5 shows typical output data from the EBC chill haze method.

The alcohol chill haze was calculated by subtracting the final haze with the initial haze in EBC units. See FIG. 5.

Methods Tannoids

A perfusion syringe, made of glass, was filled with the 0.400 g/L PVP solution and placed on the provided holder on the Tannometer (Pfeuffer GmbH, Germany). Beer samples from the 1000 mL collection bottles were analyzed within 20 hour after beer stabilization process. First non-stabilized beer from the Cornelius bottle were analyzed followed by the CSS adsorber reference sample and the prototypes. ~20 mL beer was transferred into a 50 mL Falcon tube and the tube was shaked briefly to remove carbon dioxide. After the beer has been settled, 4×1.0 mL of the beer was pipetted carefully into the cuvette. A stirring rod was placed in the bottle of the cuvette. The sample was titrated with PVP solution from the perfusion syringe at 5 mL/h at 25° C. until 100 mg/L PVP or until the tannoid peak has reach its maximum and tannoid content was automatically calculated by the software Tannolab.

Methods Total Polyphenols

Beer samples from the 1000 mL collection bottles were analyzed within 4 hours after beer stabilization process. First non-stabilized beer from the Cornelius bottle were analyzed followed by the CSS adsorber reference sample and prototypes. ~50 mL beer was filtered through a Whatman™ filter paper into a 200 mL E-flask. 2×10 mL of beer was pipetted into two 25 mL volumetric flask. 8 mL of the CMC/EDTA solution was added into both volumetric flasks. 500 µL ferric reagent was added only to one flask and 500 µL ammonia solution was pipetted into both volumetric flasks. MilliQ™ water was added to the mark of the volumetric flasks. The flasks were mixed briefly. The flask without ferric reagent was the blank sample. The absorbance at 600 nm was measured after >10 min (within 60 min) for sample and blank, using a 10 cm cuvette. The total polyphenol content in the flask was calculated by the formula:

$$TP = (A_S - A_B) \times 820$$

Were $TP$=Total polyphenols (mg/L)

$A_S$=Absorbance for sample, AU $A_B$=Absorbance for blank, AU

Total polyphenol reduction was calculated by dividing total polyphenols of the beer sample processed through prototypes with total polyphenols from non-stabilized beer.

Since the physical and chemical properties of non-stabilized beer change quickly it was only possible to run and analyze 3-6 prototypes and reference CSS adsorber with non-stabilized beer within the required time period of 24 hours. Therefore, the 12 prototypes were run with the beer application in 4 sets.

Primary the prototypes were analyzed with the Tannoid content assay. Since the three first prototypes tested bound all tannoids in the beer it was impossible to evaluate their tannoid binding capacity so next prototypes were only evaluated with the alcohol chill haze analysis. For PVP grafted beads, a larger amount of beer per mL media may be needed to investigate the tannoid capacity. However, the CSS adsorber beads only reduce the Tannoid content from 69.8 to 32.8 mg/L, indicating that the PVP grafted prototypes are significantly more capable to bind tannoids than CSS adsorber.

Figure 6:
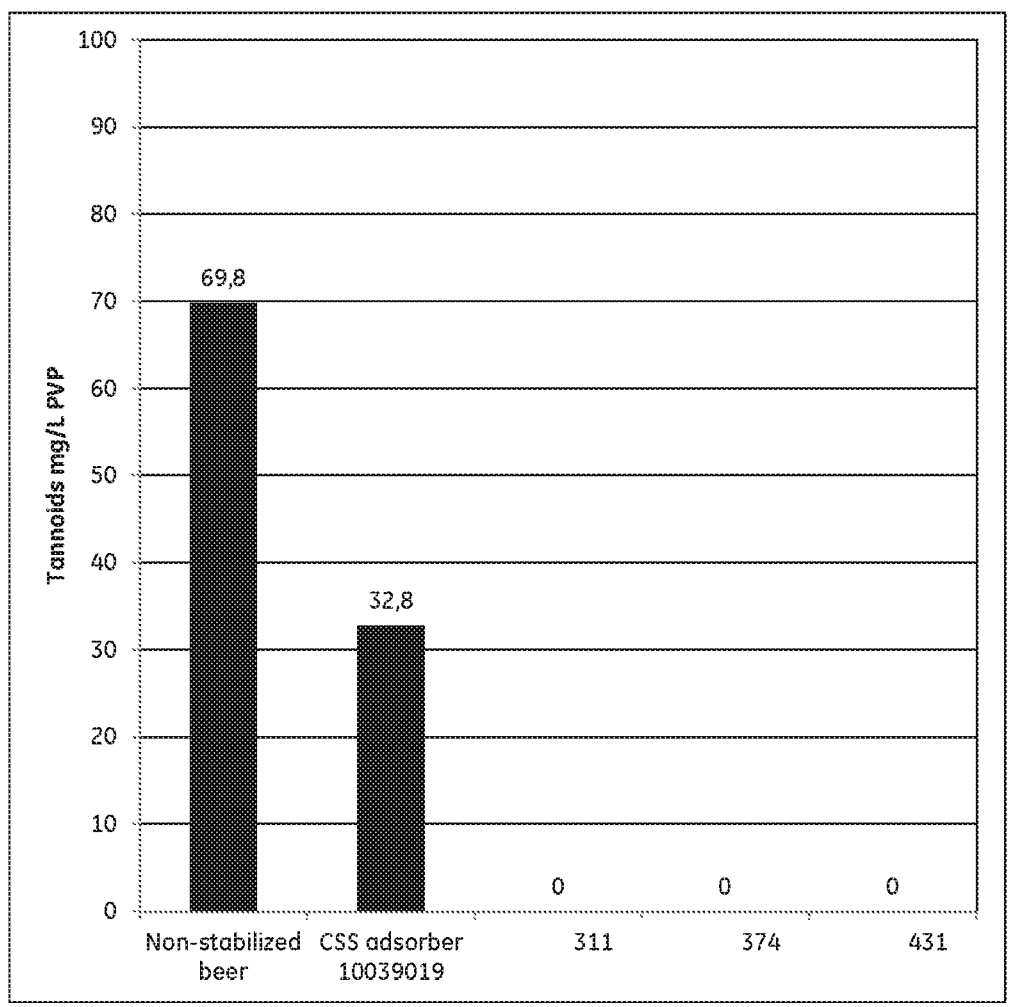
FIG. 6 shows the tannoid content in non-stabilized beer, beer stabilized with the reference and beer stabilized with three prototypes of the invention.
Figure 7:
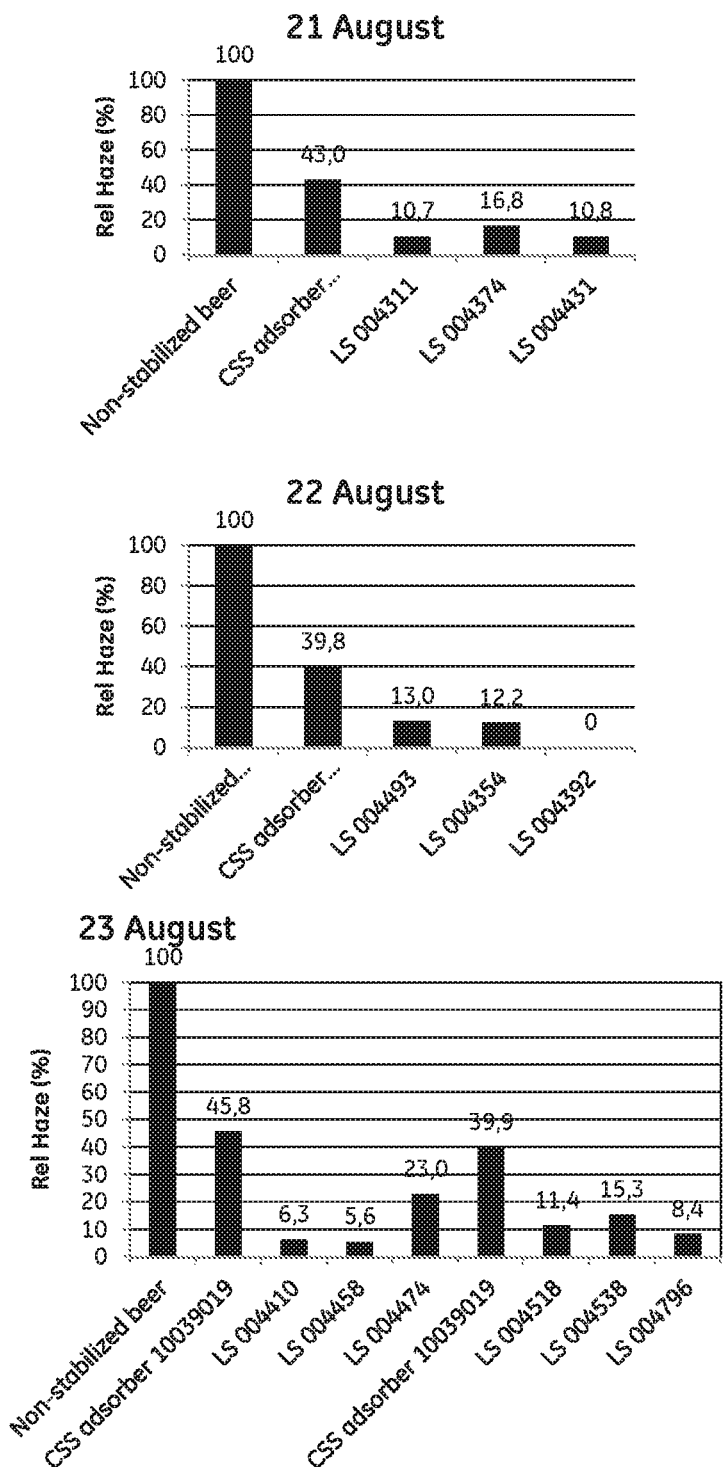
FIG. 7 shows graphical views on the normalized results for chill haze analysis. The three graphs relate to three batches of fresh beer, produced on three different days.

FIG. 6 shows the results of the tannoid content. "Uppsala 1" lot was used.

Table 4 shows the alcohol chill haze analysis results for the prototypes. The chill haze was normalized and the relative percentage of chill haze compared to non-stabilized beer was calculated for the prototypes. "Uppsala 1" lot was used.

TABLE 4

Alcohol chill haze results.

| Prototype | Chill haze (EBC units) | Rel. Haze (%) |
|---|---|---|
| Date: 21 Aug. 2013 | | |
| Non-stabilized beer | 26.25 | 100 |
| CSS adsorber 10039019 | 11.28 | 43.0 |
| 311 | 2.81 | 10.7 |
| 374 | 4.41 | 16.8 |
| 431 | 2.84 | 10.8 |
| Date: 22 Aug. 2013 | | |
| Non-stabilized beer | 27.05 | 100 |
| CSS adsorber 10039019 | 10.77 | 39.8 |
| 493 | 3.52 | 13.0 |
| 354 | 3.29 | 12.2 |
| 392 | 0 | 0 |
| Date: 23 Aug. 2013 | | |
| Non-stabilized beer | 25.7 | 100 |
| CSS adsorber 10039019 | 11.76 | 45.8 |
| 410 | 1.62 | 6.3 |
| 458 | 1.44 | 5.6 |
| 474 | 5.9 | 23.0 |
| CSS adsorber 10039019 | 10.26 | 39.9 |
| 518 | 2.94 | 11.4 |
| 538 | 3.94 | 15.3 |
| 796 | 2.15 | 8.4 |

To estimate the variation inside the assay to judge if results differ significant or not the mean and relative standard deviation of the CSS adsorber reference that was run four times was evaluated.

N=4
Mean=42.1%
SD=2.9%
RSD=6.9%

Table 5 and FIG. 8 show the total polyphenol reduction results. Total polyphenol reduction was measured for the 750 mL beer fraction and also for the 50 mL fraction, collected after the 750 mL to investigate if the prototype was still adsorbing total polyphenols. In FIG. 6, for each prototype the first bar is the 750 mL fraction and the second bar is the 50 mL fraction. "Uppsala 2" beer lot was used.

TABLE 5

Polyphenol reduction results

| Sample | Date | $A_{600}$ sample | $A_{600}$ Blank | Sample-blank | Polyphenol amount (mg/L) | Polyphenol reduction (%) |
|---|---|---|---|---|---|---|
| non-stabilized beer | 18 Sep. 2013 | 0.197 | 0.036 | 0.161 | 132.0 | — |
| CSS | 18 Sep. 2013 | 0.165 | 0.028 | 0.137 | 112.3 | 14.9 |
| CSS after 750 mL | 18 Sep. 2013 | 0.184 | 0.032 | 0.152 | 124.6 | 5.6 |
| 311 | 18 Sep. 2013 | 0.118 | 0.029 | 0.089 | 73.0 | 44.7 |
| 311 after 750 mL | 18 Sep. 2013 | 0.155 | 0.034 | 0.121 | 99.2 | 24.8 |
| 354 | 18 Sep. 2013 | 0.102 | 0.027 | 0.075 | 61.5 | 53.4 |
| 354 after 750 mL | 18 Sep. 2013 | 0.157 | 0.031 | 0.126 | 103.3 | 21.7 |
| 392 | 18 Sep. 2013 | 0.118 | 0.028 | 0.09 | 73.8 | 44.1 |
| 392 after 750 mL | 18 Sep. 2013 | 0.162 | 0.029 | 0.133 | 109.1 | 17.4 |
| non-stabilized beer | 19 Sep. 2013 | 0.189 | 0.032 | 0.157 | 128.7 | — |
| CSS | 19 Sep. 2013 | 0.161 | 0.03 | 0.131 | 107.4 | 16.6 |
| CSS after 750 mL | 19 Sep. 2013 | 0.18 | 0.032 | 0.148 | 121.4 | 5.7 |
| 374 | 19 Sep. 2013 | 0.117 | 0.029 | 0.088 | 72.2 | 43.9 |
| 374 after 750 mL | 19 Sep. 2013 | 0.156 | 0.032 | 0.124 | 101.7 | 21.0 |
| 410 | 19 Sep. 2013 | 0.118 | 0.028 | 0.09 | 73.8 | 42.7 |
| 410 after 750 mL | 19 Sep. 2013 | 0.17 | 0.033 | 0.137 | 112.3 | 12.7 |
| 431 | 19 Sep. 2013 | 0.111 | 0.032 | 0.079 | 64.8 | 49.7 |
| 431 after 750 mL | 19 Sep. 2013 | 0.167 | 0.03 | 0.137 | 112.3 | 12.7 |
| non-stabilized beer | 20 Sep. 2013 | 0.196 | 0.034 | 0.162 | 132.8 | — |
| CSS | 20 Sep. 2013 | 0.166 | 0.032 | 0.134 | 109.9 | 17.3 |
| CSS after 750 mL | 20 Sep. 2013 | 0.184 | 0.034 | 0.15 | 123.0 | 7.4 |
| 458 | 20 Sep. 2013 | 0.111 | 0.03 | 0.081 | 66.4 | 50.0 |
| 458 after 750 mL | 20 Sep. 2013 | 0.152 | 0.033 | 0.119 | 97.6 | 26.5 |
| 474 | 20 Sep. 2013 | 0.141 | 0.034 | 0.107 | 87.7 | 34.0 |
| 474 after 750 mL | 20 Sep. 2013 | 0.184 | 0.032 | 0.152 | 124.6 | 6.2 |
| 493 | 20 Sep. 2013 | 0.1 | 0.027 | 0.073 | 59.9 | 54.9 |
| 493 after 750 mL | 20 Sep. 2013 | 0.162 | 0.032 | 0.13 | 106.6 | 19.8 |
| CSS | 20 Sep. 2013 | 0.163 | 0.029 | 0.134 | 109.9 | 17.3 |
| CSS after 750 mL | 20 Sep. 2013 | 0.176 | 0.031 | 0.145 | 118.9 | 10.5 |
| 518 | 20 Sep. 2013 | 0.121 | 0.027 | 0.094 | 77.1 | 42.0 |
| 518 after 750 mL | 20 Sep. 2013 | 0.141 | 0.032 | 0.109 | 89.4 | 32.7 |
| 538 | 20 Sep. 2013 | 0.116 | 0.029 | 0.087 | 71.3 | 46.3 |
| 538 after 750 mL | 20 Sep. 2013 | 0.162 | 0.031 | 0.131 | 107.4 | 19.1 |
| 796 | 20 Sep. 2013 | 0.119 | 0.027 | 0.092 | 75.4 | 43.2 |
| 796 after 750 mL | 20 Sep. 2013 | 0.165 | 0.031 | 0.134 | 109.9 | 17.3 |

All prototypes showed less chill haze than CSS adsorber using approximate same beer process settings as the CSS adsorber process use today, 750 mL beer/mL media.

Two prototypes showed strongly significant divergence from other prototypes. Beer processed through 392 showed no chill haze at all and 474 showed strongly significant higher amount of chill haze than other prototypes.

Beer processed through all other prototypes showed a chill haze of 1.4-4.4 EBC units and they were difficult to differentiate.

All prototypes showed higher total polyphenol reduction than CSS adsorber. Prototype 474 showed less total polyphenol reduction than other prototypes.

It should be noted that alcohol chill haze assay also includes simple monomeric flavanols that are not able to crosslink polypeptides above 0° C. and at less alcohol content. These flavanols are also not able to polymerise since the oxidation products of these polyphenols are stable. Beer processed through 311, 377 and 431 showed zero in tannoid content and differed 2.8-4.4 EBC units in chill haze. It is therefore mainly the selectivity to bind simple monomeric flavanols that differs between prototypes.

From prototype design perspective, to judge how the results from the beer application results relates to parameters used in synthesis there are in general no correlation except for prototype 392 (no chill haze was observed) and 474 (relatively high chill haze content). 392 is the only prototype that has been synthesized at 35° C., 10-20° C. lower than other prototypes. It can be speculated that ligand synthesis at higher temperature affects the conformability of the PVP polymer and at lower temperature the polymer is more flexible and are able to bind even low molecular weight polyphenols with few hydroxyl groups exposed. 474 has much lower ligand density than other prototypes and the breakthrough of more complex polyphenols has occurred during the process. FIG. 8 shows the correlation between total polyphenols and chill haze. From this figure, it is easy to distinguish between prototypes that have >100 mg PVP/mL media and high polyphenol reduction in comparison to a low PVP/mL media prototype (474) and CSS adsorber.

Example 2. Comparative Examples

Agarose beads grafted with diethylene glycol vinyl ether (DEGVE) were prepared according to the methods disclosed in US20100028505 and U.S. Pat. No. 8,137,559 by allylating Sepharose™ 6 FastFlow crosslinked agarose beads (GE Healthcare Bio-Sciences AB) with allyl glycidyl ether and reacting 10 g humid allylated beads with a solution of 1.6 g 2,2'-azobis(2-methylbutyronitrile) in 40 g diethylene glycol vinyl ether at 70° C. for 18 h under inert atmosphere. The beads were then washed with large amounts of water and ethanol. The content of grafted DEGVE was measured from the increase in dry content and was found to be 0.76 mmol DEGVE monomer residues per mL beads.

5 ml aliquots of the DEGVE grafted prototype and a sample of CSS adsorber beads were packed in XK 16 columns (GE Healthcare Bio-Sciences AB) and 1000 ml filtrated non-stabilized beer was pumped through each column at a flow rate of 13 ml/min. The chill haze was measured before and after passage of the columns and the haze reduction was found to be approximately the same for the DEGVE prototype and the CSS adsorber. Accordingly, as in the previous example, the PVP grafted prototypes show significantly better haze reduction than the CSS adsorber beads, they are also better than the DEGVE prototype.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All patents and patent applications mentioned in the text are hereby incorporated by reference in their entireties as if they were individually incorporated.

The invention claimed is:

1. A separation matrix comprising,
   a porous solid support, comprising a polysaccharide selected from the group consisting of agarose, agar, cellulose and dextran, and
   a plurality of polyvinylpyrrolidone (PVP) polymer chains covalently attached to said solid support,
   wherein the separation matrix comprises 0.50-4.0 micromoles vinylpyrrolidone monomer residues per mL matrix;
   wherein said polyvinylpyrrolidone polymer chains are vinylpyrrolidone homopolymer chains or copolymer chains comprising less than 2 mol % negatively charged monomer residues and
   wherein the separation matrix comprises 0.5-0.8 g polyvinylpyrrolidone polymer per g dried matrix.

2. The separation matrix of claim 1, wherein said polyvinylpyrrolidone polymer chains comprise less than 1 mol % negatively charged monomer residues.

3. The separation matrix of claim 1, wherein said polyvinylpyrrolidone polymer chains comprise up to 30 mol % positively charged monomer residues.

4. The separation matrix of claim 1, wherein said porous solid support comprises particles having an average diameter of 10-500 micrometers.

5. The separation matrix of claim 1, wherein said porous solid support has a porosity of 80-98%.

6. The separation matrix of claim 1, wherein a plurality of said polyvinylpyrrolidone polymer chains are each covalently linked to said solid support via a single linking moiety.

7. The separation matrix of claim 6, wherein said single linking moiety comprises an ether-linked C3 chain.

8. The separation matrix of claim 1, comprising 0.6-0.8 g polyvinylpyrrolidone polymer per g dried matrix.

9. The separation matrix of claim 1, comprising 0.7-3.0 micromoles vinylpyrrolidone monomer residues per ml matrix.

10. The separation matrix of claim 1, comprising less than 5 micrograms/g carbon leachables.

11. A method for stabilizing a fermented beverage, comprising the steps of:
   a) providing a column packed with the separation matrix of claim 1; and
   b) passing said beverage through said column and recovering a flow-through of the column as a stabilized beverage.

12. A method of manufacturing the separation matrix of claim 1, said method comprising the steps of:
   a) providing a porous solid support comprising at least 5 micromole/ml radical-reactive moieties;
   b) contacting said support with a monomer composition wherein at least 70% of the monomers in said monomer composition is N-vinyl pyrrolidone;
   c) initiating a free radical polymerization to form a matrix having polyvinylpyrrolidone polymer chains covalently attached to the support, and;
   d) washing said matrix.

13. The method of claim 12, wherein said radical-reactive moieties are C=C double bonds.

14. The method of claim 12, wherein step a) comprises either i) providing a divinylbenzene copolymer support or ii) reacting a hydroxyfunctional support with an allyl halide or allylglycidyl ether.

15. The method of claim 14, wherein step c) is performed with the support suspended in an aqueous solution comprising N-vinyl pyrrolidone and 0.05-3 mol/l of a salt.

16. The separation matrix of claim 1, wherein the polysaccharide is agarose.

17. A method for stabilizing a fermented beverage, comprising the steps of:
   a) providing a column packed with a separation matrix comprising,
      a porous solid support, comprising a polysaccharide selected from the group consisting of agarose, agar, cellulose and dextran, and
      a plurality of polyvinylpyrrolidone polymer chains covalently attached to said solid support,
      wherein the separation matrix comprises 0.50-4.0 micromoles vinylpyrrolidone monomer residues per mL matrix, wherein said polyvinylpyrrolidone polymer chains are vinylpyrrolidone homopolymer chains or copolymer chains comprising less than 2 mol % negatively charged monomer residues and wherein the separation matrix comprises 0.5-0.8 g polyvinylpyrrolidone polymer per g dried matrix; and b) passing said beverage through said column and recovering a flow-through of the column as a stabilized beverage.

18. The method of claim 17, further comprising the steps
c) of regenerating the column with a regeneration solution and;
d) of repeating steps a)-c) at least twice.

19. The method of claim 18, wherein said regeneration solution comprises 0.1-2 M NaOH.

20. The method of claim 17, wherein in step b) the residence time of the beverage in the column is 2 min or less.

21. The method of claim 17, wherein the fermented beverage is beer.

22. The method of claim 21, wherein the stabilized beverage in step b) has a chill haze of less than 25% of the chill haze for the beverage before passage of said column.

23. The method of claim 17, wherein the polysaccharide is agarose.

* * * * *